(12) United States Patent
Park et al.

(10) Patent No.: US 7,919,559 B2
(45) Date of Patent: Apr. 5, 2011

(54) CHEMICAL-RESISTANT AND IMPACT-RESISTANT THERMOPLASTIC RESIN COMPOSITION WITH EXCELLENT HYDROLYSIS RESISTANCE

(75) Inventors: Jee Kwon Park, Anyang-si (KR); Jun Myung Kim, Seoul (KR); Jin Hwan Choi, Anyang-si (KR); Jae Won Lee, Osan-si (KR)

(73) Assignee: Cheil Industries Inc., Gumi-si (KR)

( * ) Notice: Subject to any disclaimer, the term of this patent is extended or adjusted under 35 U.S.C. 154(b) by 183 days.

(21) Appl. No.: 12/335,901

(22) Filed: Dec. 16, 2008

(65) Prior Publication Data

US 2009/0170735 A1 Jul. 2, 2009

(30) Foreign Application Priority Data

Dec. 27, 2007 (KR) ................ 2007-139118

(51) Int. Cl.
*C08L 33/14* (2006.01)
*C08L 51/04* (2006.01)
*C08L 55/02* (2006.01)
*C08L 67/03* (2006.01)

(52) U.S. Cl. ............... 525/64; 524/504; 525/74

(58) Field of Classification Search .......... None
See application file for complete search history.

(56) References Cited

U.S. PATENT DOCUMENTS

| 6,277,905 | B1* | 8/2001 | Keep ................ 524/94 |
| 7,612,131 | B2* | 11/2009 | Yamada ............ 524/126 |
| 2007/0213458 | A1* | 9/2007 | Topoulos ........... 524/601 |
| 2008/0153954 | A1* | 6/2008 | Arpin ................ 524/186 |
| 2009/0012217 | A1* | 1/2009 | Jung et al. .......... 524/147 |
| 2009/0181199 | A1* | 7/2009 | Agarwal et al. .... 428/36.8 |

FOREIGN PATENT DOCUMENTS

| JP | 01-263149 A | | 10/1989 |
| JP | 1-263149 A | * | 10/1989 |
| JP | 06-248159 A | | 9/1994 |
| JP | 2003-138135 A | | 5/2003 |
| JP | 2004-018793 A | | 1/2004 |
| JP | 2004-18793 A | * | 1/2004 |
| JP | 2006-143955 A | | 6/2006 |

* cited by examiner

*Primary Examiner* — Robert Sellers
(74) *Attorney, Agent, or Firm* — Summa, Additon & Ashe, P.A.

(57) ABSTRACT

Disclosed herein is a chemical-resistant and impact-resistant thermoplastic resin composition having excellent hydrolysis resistance. The thermoplastic resin composition comprises (A) about 1 to about 97.9% by weight of an epoxy group-containing vinyl copolymer resin; (B) about 1 to about 97.9% by weight of a rubber modified aromatic vinyl copolymer resin; (C) about 1 to about 97.9% by weight of a polyester resin; and (D) about 0.1 to about 97% by weight of an amorphous cycloaliphatic diol modified polyester.

17 Claims, No Drawings

CHEMICAL-RESISTANT AND IMPACT-RESISTANT THERMOPLASTIC RESIN COMPOSITION WITH EXCELLENT HYDROLYSIS RESISTANCE

CROSS-REFERENCE TO RELATED APPLICATION

This application claim priority from Korean Patent Application No. 10-2007-139118 filed on Dec. 27, 2007 in the Korean Intellectual Property Office, the disclosure of which is incorporated herein by reference in its entirety.

FIELD OF THE INVENTION

The present invention relates to a thermoplastic resin composition having good chemical resistance and impact resistance. In particular, the present invention relates to a chemical-resistant and impact-resistant thermoplastic resin composition with excellent hydrolysis resistance.

BACKGROUND OF THE INVENTION

Acrylonitrile-butadiene-styrene copolymer resin (hereinafter referred to as 'ABS resin') is a resin in which a copolymer of styrenic monomer and acrylonitrile monomer grafted to butadiene rubbery polymer (hereinafter referred to as 'g-ABS') is dispersed in a matrix of styrene-acrylonitrile copolymer resin (hereinafter referred to as 'SAN'). ABS resin has balanced properties of good processability, impact strength, rigidity, and melt strength, in addition to excellent colorability and gloss, and thus it has been widely used in the production of automobile goods, household electric/electronic appliances and OA supplies which need a good appearance.

When ABS resins are used for internal or external parts of electric/electronic goods such as blenders, washing machines, fans, and the like, which are subject to repeated stresses caused by driving of a motor, these parts should resist such stress and remain durable for extended use. Thus resins used to produce such products should also have good impact resistance and chemical resistance to strong chemicals such as acetic acid or diesel oil.

Polyester resins typically have a structure including short chains, and thus may not bend easily. Accordingly, polyester resins can have good rigidity, electrical properties, weather resistance and heat resistance, and the tensile strength of polyester resins may not be affected even after long term exposure to high temperatures. Further, crystalline polyester resins have good resistance to various chemicals such as diesel oil. However, the properties of polyester resins such as processability and impact resistance can degrade when they are exposed to acid or alkali for a long time at a high temperature due to their crystallinity.

Reinforcing agents such as glass fiber can be added to the polyester resins when polyester resins are employed as a structural material. If reinforcing agents are not added, it is difficult to use polyester resins as a structural material produced by injection molding. In addition, since polyester resins have low melt strength, their use is limited because it is difficult to use polyester resins in extrusion molding to produce thick sheets or pipes, other than films.

Recent attempts to prepare thermoplastic resins having good chemical resistance and impact resistance include alloying polyester resin with ABS resin. However, moisture degrades polyester at high temperatures and properties can be easily affected and deteriorated depending on the conditions of drying and molding. Hence, the alloy has a disadvantage in that it is difficult to control various conditions of drying and molding in order avoid adversely affecting the alloy.

SUMMARY OF THE INVENTION

The present invention is directed to a thermoplastic resin composition having chemical resistance and impact resistance as well as excellent hydrolysis resistance.

The present invention also provides a molded article molded from the thermoplastic resin composition.

Other objects and advantages of this invention will be apparent from the ensuing disclosure and appended claims.

According to an aspect of the present invention, there is provided a chemical-resistant and impact-resistant thermoplastic resin composition having excellent hydrolysis resistance. The thermoplastic resin comprises (A) about 1 to about 97.9% by weight of an epoxy group-containing vinyl copolymer resin; (B) about 1 to about 97.9% by weight of a rubber modified aromatic vinyl copolymer resin; (C) about 1 to about 97.9% by weight of a polyester resin; and (D) about 0.1 to about 97% by weight of amorphous cycloaliphatic diol modified polyester.

In an exemplary embodiment, the thermoplastic resin composition may comprise (A) about 10 to about 80% by weight of an epoxy group-containing vinyl copolymer resin; (B) about 10 to about 80% by weight of a rubber modified aromatic vinyl copolymer resin; (C) about 1 to about 60% by weight of a polyester resin; and (D) about 1 to about 30% by weight of an amorphous cycloaliphatic diol modified polyester. In another exemplary embodiment, the thermoplastic resin composition may comprise (A) about 15 to about 60% by weight of an epoxy group-containing vinyl copolymer resin; (B) about 20 to about 60% by weight of a rubber modified aromatic vinyl copolymer resin; (C) about 10 to about 50% by weight of a polyester resin; and (D) about 2 to about 25% by weight of an amorphous cycloaliphatic diol modified polyester.

The epoxy group-containing vinyl copolymer resin may be a copolymer prepared by polymerizing a monomer mixture comprising about 0.01 to about 5.0 mol % of an epoxy group-containing unsaturated epoxy compound ($A_1$) and about 95 about 99.99 mol % of a vinyl compound ($A_2$).

The unsaturated epoxy compound ($A_1$) may include epoxyl alkyl acrylate, allyl glycidyl ester, aryl glycidyl ester, glycidyl methacrylate, glycidyl acrylate, butadiene monooxide, vinyl glycidyl ether, glycidyl itaconate, and the like, and combinations thereof.

The vinyl compound may comprise about 40 to about 90% by weight of an aromatic vinyl monomer and about 10 to about 60% by weight of a monomer copolymerizable with the aromatic vinyl monomer.

In exemplary embodiments, the monomer copolymerizable with the aromatic vinyl monomer may be an unsaturated nitrile monomer.

The rubber modified aromatic vinyl copolymer resin (B) may comprise ($B_1$) about 10 to about 100% by weight of a graft copolymer resin, and ($B_2$) about 0 to about 90% by weight of a copolymer resin.

In exemplary embodiments, the rubber modified aromatic vinyl copolymer resin (B) may have a Z-average rubber particle size of about 0.1 to about 6.0 μm.

In exemplary embodiments, the polyester resin (C) may comprise inorganic particles.

The amorphous cycloaliphatic diol modified polyester (D) may have an intrinsic viscosity of about 0.5 to about 1.0 dL/g.

The amorphous cycloaliphatic diol modified polyester (D) may have about 0.1 to about 99 mol % of 1,4-cyclohexanedimethanol per total acid component. In exemplary embodiments, the amorphous cycloaliphatic diol modified polyester (D) may have about 20 to about 60 mol % of 1,4-cyclohexanedimethanol per total acid component.

In exemplary embodiments, the thermoplastic resin composition may have an Izod impact strength (ASTM D 256, ⅛" notch) of about 70 kgf·cm/cm or more measured for a specimen injected after drying for 3 hours at 100° C., and the difference between the Izod impact strength and an Izod impact strength measured for a specimen injected after drying for 1 hour at 80° C. may be about ±15 kgf·cm/cm or less.

The thermoplastic resin composition of the present invention may further comprise at least one additive selected from the group consisting of anti-dropping agents, flame retardants, antimicrobials, thermal stabilizers, antioxidants, releasing agents, light stabilizers, compatibilizers, pigments, inorganic fillers, surfactants, nucleating agents, coupling agents, fillers, plasticizers, impact modifiers, colorants, stabilizers, lubricants, antistatic agents, dyes, flameproof agents, and the like, and combinations thereof.

Another aspect of the present invention provides a molded article produced from the chemical-resistant and impact-resistant thermoplastic resin composition. The molded article includes pellets prepared by extruding the thermoplastic resin composition of the present invention, in addition to housings of electric/electronic appliances molded from the resin composition

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Epoxy Group-Containing Vinyl Copolymer Resin

The epoxy group-containing vinyl copolymer resin is a resin prepared by polymerizing a monomer mixture comprising an epoxy group-containing unsaturated epoxy compound ($A_1$) and a vinyl compound ($A_2$) so that the unsaturated epoxy group is present in the vinyl copolymer. The monomer mixture can comprise about 0.01 to about 5.0 mol % of an epoxy group-containing unsaturated epoxy compound ($A_1$) and about 95 to about 99.99 mol % of a vinyl compound ($A_2$). In exemplary embodiments, the monomer mixture may comprise about 0.1 to about 5.0 mol % of an epoxy group-containing unsaturated epoxy compound ($A_1$) and about 95 to about 99.9 mol % of a vinyl compound ($A_2$).

The epoxy group-containing vinyl copolymer resin (A) may be used in the thermoplastic resin composition of the present invention in an amount of about 1 to about 97.9% by weight. In an exemplary embodiment, the epoxy group-containing vinyl copolymer resin (A) may be used in an amount of about 10 to about 80% by weight. In another exemplary embodiment, the epoxy group-containing vinyl copolymer resin (A) may be used in an amount of about 15 to about 60% by weight. In yet another exemplary embodiment, the epoxy group-containing vinyl copolymer resin (A) may be used in an amount of about 20 to about 40% by weight. Within these ranges, a good balance of properties such as chemical resistance, impact resistance, and hydrolysis resistance can be obtained.

($A_1$) Epoxy Group-Containing Unsaturated Epoxy Compound

The unsaturated epoxy compound used in the epoxy group-containing vinyl copolymer can be represented by the following chemical formula 1:

[Chemical Formula 1]

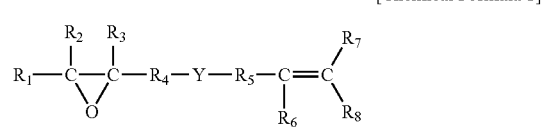

wherein: $R_1$, $R_2$, $R_3$, $R_6$, $R_7$ and $R_8$ are each independently hydrogen, saturated or unsaturated $C_1$-$C_{12}$ alkyl, $C_6$-$C_{14}$ aryl, or saturated or unsaturated $C_1$-$C_{12}$ alkyl-substituted $C_6$-$C_{14}$ aryl; and Y is an ether group (—O—), carboxyl group (-0-[C=O]—, —[O=C]—O—), $C_1$-$C_{12}$ alkylene, $C_6$-$C_{14}$ arylene, or saturated or unsaturated $C_1$-$C_{12}$ alkyl-substituted $C_6$-$C_{14}$ arylene;

with the proviso that when Y is an ether group (—O—) or carboxyl group (-0-[C=O]—, —[O=C]—O—), $R_4$ and $R_5$ are each independently $C_1$-$C_{12}$ alkylene, $C_6$-$C_{14}$ arylene or saturated or unsaturated $C_1$-$C_{12}$ alkyl-substituted $C_6$-$C_{14}$ arylene; and when Y is $C_1$-$C_{12}$ alkylene, $C_6$-$C_{14}$ arylene or saturated or unsaturated $C_1$-$C_{12}$ alkyl-substituted $C_6$-$C_{14}$ arylene, Y represents a ($R_4$—Y—$R_5$) structure.

Examples of the unsaturated epoxy compound compound may include without limitation epoxyl alkyl acrylate, ally glycidyl ester, aryl glycidyl ester, glycidyl methacrylate, glycidyl acrylate, butadiene monoxide, vinyl glycidyl ether, glycidyl itaconate, and the like. These epoxy-based compounds can by used alone or in combination with one another.

The epoxy compound is added as a copolymerizable monomer in an amount of about 0.01 to about 5 mol %, for example about 0.1 to about 5 mol %, and as another example about 0.5 to about 5 mol %. If the amount of the epoxy compound is less than about 0.01 mol %, it may be difficult to improve impact strength. When the amount of the epoxy compound exceeds about 5 mol %, there may be a problem of gelation during an extrusion process. In an exemplary embodiment, the unsaturated epoxy compound ($A_1$) is used in an amount of about 1 to about 5 mol %. In another exemplary embodiment, the unsaturated epoxy compound ($A_1$) is used in an amount of about 3 to about 5 mol %.

($A_2$) Vinyl Compound

The vinyl compound used in the epoxy group-containing vinyl copolymer of the present invention may comprise aromatic vinyl monomers and a monomer copolymerizable with the aromatic vinyl monomer.

Examples of the aromatic vinyl monomer may include, but are not limited to, styrene, α-methyl styrene, β-methyl styrene, p-methyl styrene, p-t-butylstyrene, ethylstyrene, vinyl xylene, monochlorostyrene, dichlorostyrene, dibromostyrene, vinyl naphthalene and the like. These aromatic vinyl monomers can be used alone or in combination with one another.

The monomer copolymerizable with the aromatic vinyl monomer may be used alone or in combination with other copolymerizable monomers. Examples of the monomer copolymerizable with the aromatic vinyl monomer may include, but are not limited to, unsaturated nitrile monomers such as acrylonitrile, methacrylonitrile, and ethacrylonitrile.

The ratio of the aromatic vinyl monomers to the monomer copolymerizable with the aromatic vinyl monomer can be determined based on compatibility and the ratio of monomers of the rubber modified aromatic vinyl copolymer resin (B) excluding rubber. The vinyl compound may include about 40 to about 90% by weight of an aromatic vinyl monomer and about 10 to about 60% by weight of a monomer copolymerizable with the aromatic vinyl monomer. An another example, the vinyl compound may include about 50 to about 80% by weight of an aromatic vinyl monomer and about 20 to about 50% by weight of a monomer copolymerizable with the aromatic vinyl monomer. In exemplary embodiments, the vinyl compound ($A_2$) may include about 55 to about 80% by weight of an aromatic vinyl monomer and about 20 to about 45% by weight of a monomer copolymerizable with the aromatic vinyl monomer. If the amount of the aromatic vinyl monomer is less than about 40% by weight, viscosity may increase significantly, which can adversely affect molding performance. When the amount of the aromatic vinyl monomer is more than about 90% by weight, it may be difficult to improve mechanical strength.

In order to impart processability and heat resistance, the vinyl compound ($A_2$) of the present invention may optionally include monomers such as acrylic acid and methacrylic acid; $C_1$-$C_4$ alkyl acrylates and $C_1$-$C_4$ alkyl methacrylates such as methyl methacrylate, phenyl acrylate, phenyl methacrylate, benzyl acrylate, benzyl methacrylate, 2-phenyl ethyl acrylate, 2-phenyl ethyl methacrylate, 2-phenoxyethyl acrylate, and 2-phenoxy ethyl methacrylate; N-substituted maleimide; maleic acid, fumaric acid, itaconic acid and anhydrides thereof; dimethylaminoethyl acrylate, diethylaminoethyl acrylate, vinylimidazole, vinylpyrrolidone, vinylcaprolactam, vinylcarbazole, vinylaniline, acrylamide and methacrylamide, and the like, and combinations thereof. The monomers for imparting processability and heat resistance may be used in an amount of about 0 to about 30% by weight, for example about 1 to about 20% by weight, and as another example about 2 to about 15% by weight, per total weight of the vinyl compound ($A_2$).

(B) Rubber Modified Aromatic Vinyl Copolymer Resin

The rubber modified aromatic vinyl copolymer resin according to the present invention can be a polymer in which rubbery polymers are dispersed in the form of particles in a matrix (continuous phase) comprising an aromatic vinyl polymer. The rubber modified aromatic vinyl resins may be prepared by polymerizing the aromatic vinyl group-containing monomers with rubbery polymers, and selectively monomers copolymerizable with the aromatic vinyl monomer may be added thereto. The rubber modified aromatic vinyl copolymer resin may be prepared by methods such as emulsion polymerization, suspension polymerization, and bulk polymerization. Conventionally, the rubber modified aromatic vinyl resins are prepared by extruding a graft copolymer resin and a copolymer resin, after each is prepared separately. In bulk polymerization, both a graft copolymer resin and a copolymer resin are prepared together in one process. Regardless of the polymerization method used, the rubber content in a final rubber modified aromatic vinyl copolymer resin is about 5 to about 30% by weight.

In the present invention, in order to obtain desirable properties in the alloy of the rubber modified aromatic vinyl copolymer resin and polyester resin, the Z-average size of rubber particles of the rubber can range from about 0.1 to about 6.0 µm, for example about 0.25 to about 3.5 µm.

The rubber modified aromatic vinyl copolymer resin used in the present invention can be prepared by using a graft copolymer resin alone or using a graft copolymer resin and copolymer resin together, taking into consideration the compatibility of each.

($B_1$) Graft Copolymer Resin

The graft copolymer resin of the present invention may be prepared by graft-copolymerizing rubbery polymers, aromatic vinyl monomers, monomers copolymerizable with the aromatic vinyl monomers, and optionally other monomers imparting processability and heat resistance.

Examples of the rubbery polymers may include diene rubbers such as polybutadiene, poly(styrene-butadiene), poly(acrylonitrile-butadiene), and the like; saturated rubbers in which hydrogen is added to the diene rubbers; isoprene rubbers; acryl rubbers such as polybutyl acrylic acid; terpolymers of ethylene-propylene-diene (EPDM), and the like, and combinations thereof. The rubbery polymer may be used in an amount of about 5 to about 65% by weight based on about 100% by weight of the graft copolymer resin ($B_1$). The average size of the rubber particles can range from about 0.1 to about 6.0 µm, depending on the desired impact strength and appearance of the resin composition.

Examples of the aromatic vinyl monomer may include, but are not limited to, styrene, α-methyl styrene, β-methyl styrene, p-methyl styrene, p-t-butylstyrene, ethyl styrene, vinyl xylene, monochlorostyrene, dichlorostyrene, dibromostyrene, vinyl naphthalene and the like, and combinations thereof. The aromatic vinyl monomer may be used in an amount of about 34 to about 94% by weight based on the total weight of the graft copolymer resin ($B_1$).

The graft copolymer resin ($B_1$) may include at least one other monomer copolymerizable with the aromatic vinyl monomer. Examples of the copolymerizable monomer may include vinyl cyanide compounds such as acrylonitrile, unsaturated nitrile-containing compounds such as methacrylonitrile and ethacrylonitrile, and the like. These monomers may be used alone or in combination with one another. The monomer copolymerizable with the aromatic vinyl monomer may be used in an amount of about 1 to about 30% by weight, based on the total weight of the graft copolymer resin ($B_1$).

Examples of the monomers imparting processability and heat resistance may include acrylic acid, methacrylic acid, maleic anhydride, N-substituted maleimide, and the like, and combinations thereof. The monomers imparting processability and heat resistance may be used in an amount of about 0 to about 15% by weight, based on the total weight of the graft copolymer resin ($B_1$).

($B_2$) Copolymer Resin

The copolymer resin of the present invention may be prepared by copolymerizing aromatic vinyl monomers, monomers copolymerizable with the aromatic vinyl monomers, and optionally other monomers imparting processability and heat resistance. The ratio of the monomers may be adjusted depending on the compatibility of each component and ratio of monomer excluding the rubber in the components of the graft copolymer resin ($B_1$).

Examples of the aromatic vinyl monomers may include, but are not limited to, styrene, α-methylstyrene, β-methylstyrene, p-methylstyrene, p-t-butyl styrene, ethyl styrene, monochlorostyrene, dichlorostyrene, dibromostyrene, and the like, and combinations thereof. The aromatic vinyl monomers can be used in an amount of about 60 to about 90 parts by weight, based on the total weight of the copolymer resin ($B_2$).

Examples of the monomers copolymerizable with the aromatic vinyl monomers may include vinyl cyanide compounds such as acrylonitrile or unsaturated nitrile compounds such as ethacrylonitrile and methacrylonitrile, and the like, and these monomers may be used alone or in combination with one another. The monomers copolymerizable with the aromatic vinyl monomers may be used in an amount of about 10 to about 40% by weight, based on the total weight of the copolymer resin ($B_2$).

Examples of the monomers imparting processability and heat resistance may include acrylic acid, methacrylic acid, maleic anhydride, N-substituted maleimide and the like, and combinations thereof. The monomers imparting processability and heat resistance may be used in an amount of about 0 to about 30% by weight, based on the total weight of the copolymer resin ($B_2$).

In exemplary embodiments of the invention, the rubber modified aromatic vinyl copolymer resin (B) may include acrylonitrile-butadiene-styrene (ABS) copolymer resins, acrylonitrile-ethylene propylene rubber-styrene (AES) copolymer resins, acrylonitrile-acrylic rubber-styrene (AAS) copolymer resins, and the like, and combinations thereof.

The rubber modified aromatic vinyl copolymer resin (B) of the present invention may comprise about 10 to about 100% by weight of the graft copolymer resin ($B_1$) and about 0 to about 90% by weight of the copolymer resin ($B_2$).

In an exemplary embodiment, the rubber modified aromatic vinyl copolymer resin (B) may comprise about 55 to about 90% by weight of the graft copolymer resin ($B_1$) and about 10 to about 45% by weight of the copolymer resin ($B_2$). In another exemplary embodiment, the rubber modified aromatic vinyl copolymer resin (B) may comprise about 15 to about 45% by weight of the graft copolymer resin ($B_1$) and about 55 to about 85% by weight of the copolymer resin ($B_2$).

In the present invention, the rubber modified aromatic vinyl copolymer resin (B) may be used in the resin composition of the present invention in an amount of about 1 to about 97.9% by weight. In another exemplary embodiment, the rubber modified aromatic vinyl copolymer resin (B) may be used in an amount of about 10 to about 80% by weight. In yet another exemplary embodiment, the rubber modified aromatic vinyl copolymer resin (B) may be used in an amount of about 20 to about 60% by weight. In other exemplary embodiments, the rubber modified aromatic vinyl copolymer resin (B) may be used in an amount of about 30 to about 50% by weight. Within these ranges, a good balance of properties such as chemical resistance, impact resistance, and hydrolysis resistance can be obtained.

(C) Polyester Resin

Polyester resin used in the present invention is a crystalline polyester resin or a copolymer thereof which has an intrinsic viscosity of about 0.3 to about 1.15 dL/g. In exemplary embodiments, the polyester resin having an intrinsic viscosity of about 0.5 to about 1.0 dL/g may be used.

The polyester resin can be prepared by polycondensation of an aromatic dicarboxylic acid or ester thereof and a $C_2$-$C_{12}$ diol, and the preparation can be readily carried out by a person of ordinary skill in the art.

Examples of the aromatic dicarboxylic acid or ester thereof may include terephthalic acid (TPA), isophthalic acid (IPA), 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalene dicarboxylic acid, aromatic dicarboxylate in which acid is substituted with a dimethyl group such as dimethyl terephthalate (DMT) and dimethyl isophthalate, alkyl ester of naphthalene dicarboxylate, dimethyl-1,2-naphthalate, dimethyl-1,5-naphthalate, dimethyl-1,7-naphthalate, dimethyl-1,8-naphthalate, dimethyl-2,3-naphthalate, dimethyl-2,6-naphthalate, dimethyl-2,7-naphthalate, and the like, and combinations thereof.

Examples of the diols having 2 to 12 carbon atoms may include ethylene glycol, 1,2-propylene glycol, 1,3-propylene glycol, 2,2-dimethyl-1,3-propanediol, 2,2-dimethyl-1,3-propylene glycol, 1,3-butanediol, 1,4-butanediol, 1,5-pentanediol, 1,6-hexanediol, 1,3-cyclohexane dimethanol, 1,4-cyclohexane dimethanol, and the like and combinations thereof.

In exemplary embodiments of the invention, the polyester resin may be mixed with inorganic particles by conventional methods. Examples of suitable inorganic particles useful in the invention may include without limitation titanium dioxide ($TiO_2$), silicone dioxide ($SiO_2$), aluminum hydroxide ($Al(OH)_3$) and the like, and combinations thereof. The inorganic particles may be used in an amount of about 0.1 to 30% by weight per 100% by weight of a polyester resin.

In the present invention, the polyester resin (C) is part of a base resin and used in the resin composition of the present invention in an amount of about 1 to about 97.9% by weight. If the amount of the polyester resin is more than about 97.9% by weight, the resin composition may have low impact strength and flame retardancy. In an exemplary embodiment, the polyester resin (C) may be used in an amount of about 10 to about 50% by weight. In another exemplary embodiment, the polyester resin (C) may be used in an amount of about 20 to about 45% by weight. These ranges can provide a desirable balance of physical properties such as chemical resistance, impact resistance and hydrolysis resistance.

(D) Amorphous Cycloaliphatic Diol Modified Polyester

The amorphous cycloaliphatic diol modified polyester used in the present invention is a non-crystalline polyester resin which has an intrinsic viscosity of about 0.5 to about 1.0 dL/g. In exemplary embodiments, the polyester resin having an intrinsic viscosity of about 0.6 to about 0.8 dL/g may be used.

The amorphous cycloaliphatic diol modified polyester may be prepared by polymerizing an acid component and at least one cycloaliphatic diol component. The acid component can be terephthalic acid, isophthalic acid or other acids, and the diol component can include ethylene glycol, 1,4-cyclohexane dimethanol (CHDM), or other diols. In exemplary embodiments of the invention, the amorphous cycloaliphatic diol modified polyester comprises 1,4-cyclohexane dimethanol as the diol component, and other diol components can be used therewith.

In exemplary embodiments, the amorphous cycloaliphatic diol modified polyester is a copolymer comprising about 10 to about 80 mol % of cycloaliphatic diol, about 10 to about 80 mol % of aromatic dicarboxylic acid, and about 10 to about 80 mol % of $C_2$-$C_5$ alkylene glycol.

In exemplary embodiments, the amorphous cycloaliphatic diol modified polyester is a copolymer comprising 1,4-cyclohexane dimethanol, terephthalic acid and ethylene glycol (also referred to herein as "PETG," or a polyethylene terephthalate glycol modified resin). 1,4-cyclohexane dimethanol may be used in an amount of about 0.1 to about 99 mol %, for example about 20 to about 60 mol %, per acid component. In exemplary embodiments, 1,4-cyclohexane dimethanol may be used in an amount of about 25 to about 50 mol %, per total amorphous cycloaliphatic diol modified polyester (D).

The amorphous cycloaliphatic diol modified polyester (D) may be used in the resin composition of the present invention in an amount of about 0.1 to about 97% by weight. In an exemplary embodiment, the amorphous cycloaliphatic diol modified polyester (D) may be used in an amount of about 1 to about 30% by weight. In another exemplary embodiment, the amorphous cycloaliphatic diol modified polyester (D) may be used in an amount of about 2 to about 25% by weight.

In another exemplary embodiment, the amorphous cycloaliphatic diol modified polyester (D) may be used in an amount of about 4 to about 20% by weight. These ranges can provide an optimum balance of physical properties such as chemical resistance, impact resistance, and hydrolysis resistance.

The thermoplastic resin composition of the present invention can have an Izod impact strength (ASTM D 256, 1/8" notch) of about 70 kgf·cm/cm or more measured for a specimen injected after drying for 3 hours at 100° C., and the difference between the Izod impact strength and an Izod impact strength measured for a specimen injected after drying for 1 hour at 80° C. is about ±15 kgf·cm/cm or less. In exemplary embodiments, the Izod impact strength (ASTM D 256, 1/8" notch) is about 70 to about 120 kgf·cm/cm measured for a specimen injected after drying for 3 hours at 100° C., and the difference between the Izod impact strength and an Izod impact strength measured for a specimen injected after drying for 1 hour at 80° C. is about ±12 kgf·cm/cm or less.

The thermoplastic resin composition of the present invention may further comprise additives selected from the group consisting of anti-dropping agents, flame retardants, antimicrobials, releasing agents, thermal stabilizers, antioxidants, light stabilizers, compatibilizers, pigments, inorganic fillers, surfactants, nucleating agents, coupling agents, fillers, plasticizers, impact modifiers, colorants, stabilizers, lubricants, antistatic agents, dyes, flameproof agents, and the like. These additives may be used alone or in combination with one another. The inorganic fillers may include glass fiber, silica, talc, ceramic, and the like.

The resin composition according to the present invention can be prepared by a conventional process. For example, all the components and additives can be mixed together and extruded through an extruder and can be prepared in the form of pellets.

The present invention provides a molded article produced from the resin composition. The resin composition of the present invention can be molded into various products. The resin composition of the invention can be particularly suitable for the housings of electric/electronic appliances such as mixers, washing machines, fans and humidifiers, computer housings, office equipment housings, and the like.

The invention may be better understood by reference to the following examples which are intended for the purpose of illustration and are not to be construed as in any way limiting the scope of the present invention, which is defined in the claims appended hereto.

EXAMPLES (A) Epoxy Group-Containing Vinyl Copolymer
(A1) Epoxy Group-Containing Vinyl Copolymer (GMA 0.7 mol %—SAN)

To a mixture comprising 100 parts by weight of monomer mixture including 0.7 mol % of glycidyl methacrylate and 74.3 mol % of styrene and 25 mol % of acrylonitrile are added 120 parts by weight of deionized water, 0.2 parts by weight of azobisisobutyronitrile, 0.4 parts by weight of tricalcium phosphate, and 0.2 parts by weight of mercaptan-containing chain transfer agent. Then the temperature of the mixture is increased from room temperature to 80° C. for 60 minutes. After maintaining this temperature for 180 minutes, an epoxy group-containing styrene-acrylonitrile copolymer resin (GMA-SAN) is obtained. The resultant product is washed, dehydrated and dried to obtain an epoxy group-containing styrene-acrylonitrile copolymer resin (GMA-SAN) in powder form.

(A2) Epoxy Group-Containing Vinyl Copolymer (GMA 5.0 mol %—SAN)

To a mixture comprising 100 parts by weight of monomer mixture including 5.0 mol % of glycidyl methacrylate and 70 mol % of styrene and 25 mol % of acrylonitrile are added 120 parts by weight of deionized water, 0.2 parts by weight of azobisisobutyronitrile, 0.4 parts by weight of tricalcium phosphate, and 0.2 parts by weight of mercaptan-containing chain transfer agent. Then the temperature of the mixture is increased from room temperature to 80° C. for 60 minutes. After maintaining this temperature for 180 minutes, an epoxy group-containing styrene-acrylonitrile copolymer resin (GMA-SAN) is obtained. The resultant product is washed, dehydrated and dried to obtain an epoxy group-containing styrene-acrylonitrile copolymer resin (GMA-SAN) in powder form.

(A3) Epoxy Group-Containing Vinyl Copolymer (GMA 10.0 mol %—SAN)

To a mixture comprising 100 parts by weight of monomer mixture including 10.0 mol % of glycidyl methacrylate and 65.0 mol % of styrene and 25 mol % of acrylonitrile are added 120 parts by weight of deionized water, 0.2 parts by weight of azobisisobutyronitrile, 0.4 parts by weight of tricalcium phosphate, and 0.2 parts by weight of mercaptan-containing chain transfer agent. Then the temperature of the mixture is increased from room temperature to 80° C. for 60 minutes. After maintaining this temperature for 180 minutes, an epoxy group-containing styrene-acrylonitrile copolymer resin (GMA-SAN) is obtained. The resultant product is washed, dehydrated and dried to obtain an epoxy group-containing styrene-acrylonitrile copolymer resin (GMA-SAN) in powder form.

(B) Rubber Modified Styrene Copolymer Resin
(B1) Graft Copolymer Resin 50 parts by weight of butadiene rubber latex, 36 parts by weight of styrene, 14 parts by weight of acrylonitrile, and 150 parts by weight of deionized water are mixed. To the mixture, 1.0 part of potassium oleate, 0.4 parts of cumen hydroperoxide, 0.2 parts of mercaptan-containing chain transfer agent, 0.4 parts of glucose, 0.01 parts of ferrous sulfate hydrate, and 0.3 parts of sodium pyrophosphate are added. The blend is kept at 75° C. for 5 hours to obtain a graft copolymer (g-ABS) latex. To the g-ABS latex, 0.4 parts of sulfuric acid is added, coagulated and dried to obtain a graft copolymer resin (g-ABS) in powder form. The average size of the rubber particles is 0.3 μm.

(B2) Styrene Copolymer Resin 75 parts of styrene, 25 parts of acrylonitrile, and 120 parts of deionized water are mixed. To the mixture, 0.2 parts of azobisisobutylonitrile (AIBN), 0.4 parts of tricalcium phosphate and 0.2 parts of mercaptan-containing chain transfer agent are added. The resultant solution is heated to 80° for 90 minutes and kept for 180 minutes, and a styrene-acrylonitrile copolymer resin (SAN) is obtained. The resultant product is washed, dehydrated and dried to obtain a styrene-acrylonitrile copolymer resin (SAN) in powder form.

(C) Polyester Resin (C1) Polyester resin having an intrinsic viscosity of 0.76 dl/g manufactured by Anychem Company (product name: A1100) is used.

(C2) Polyester resin having an intrinsic viscosity of 0.72 dl/g manufactured by Samyang Company (product name: Clear PET Flake) is used.

(D) Amorphous cycloaliphatic diol modified polyester

SKYGREEN S2008 manufactured by SK Chemical Co., Ltd. having an intrinsic viscosity of 0.8 dl/g and CHDM of 25% is used.

Example 1

The components as shown in Table 1 and 0.3 parts by weight of a thermal stabilizer are mixed in a Hansel mixer for 7 minutes to prepare a mixture. The mixture is fed into a conventional twin screw extruder with a speed of 30 kg/hr and extruded at 250° C. at a screw speed of 250 rpm as pellets. The resin pellets are dried at 100° C. for 3 hours, and molded into test specimens using a 6-oz injection molding machine at 230° C. with a barrel temperature of 60° C. The physical properties of the test specimens are measured after leaving the specimens at 23° C. and 50% of relative humidity for 40 hours.

Example 2

The components as shown in Table 1 are mixed and Example 2 is prepared in the same manner as in Example 1, except the drying conditions prior to injection are changed to 80° C. for 3 hours.

Examples 3-9 and Comparative Examples 1-8 are prepared in the same manner as Examples 1 and 2, except with the amounts of components and with the drying conditions of temperature and time as specified in Table 1.

Physical properties of the specimens are measured by the following methods.

(1) Impact strength: Izod impact strength is measured accordance with ASTM-D256 at a sample thickness of 1/8".

The final test results are obtained by calculating an average value from 5 test results (kgf·cm/cm).

(2) Chemical resistance: for measuring chemical resistance to an organic solvent, test specimens with dimensions of L 200 mm*W 50 mm*t 2 mm are equipped with ¼ oval jig and coated with organic solvent for 24 hours, and then the degree of generated crack is measured by using the following Equation 1 to obtain crack strain. As for the organic solvents, an alkali detergent manufactured by Kao Corporation of Japan (product name: Magic Clean), an acid detergent manufactured by KINCHO of Japan (product name: Sunpole), and brake oil manufactured by BOSCH (product name: DOT4) as diesel oil, pure phytoncide as an aromatic evaporator, and salad oil manufactured by Nissin of Japan as an edible oil are used.

$$\epsilon = (b \cdot t)/2a^2 * (1 - x^2(a^2-b^2)/a^4)^{-3/2} * 100(\%) \quad \text{[Equation 1]}$$

$\epsilon$: crack strain (%)
a: half length of a long axis in an oval jig (mm)
b: half length of a short axis in an oval jig (mm)
t: thickness of a test specimen (mm)
x: length from a short axis to a crack generated point (mm)

TABLE 1

| Composition | | Examples | | | | | | | | | Comparative Examples | | | | | | | |
|---|---|---|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 | 6 | 7 | 8 |
| Epoxy group-containing San resin (A) | a1 | 20 | 20 | 20 | 20 | 20 | 20 | 20 | 20 | — | — | 20 | 20 | 20 | 20 | — | — | 20 |
| | a2 | — | — | — | — | — | — | — | — | 20 | — | — | — | — | — | 20 | — | — |
| | a3 | — | — | — | — | — | — | — | — | — | — | — | — | — | — | — | 20 | — |
| ABS resin (B) | g-ABS resin (B1) | 20 | 20 | 20 | 20 | 20 | 20 | 20 | 20 | 20 | 30 | 20 | 20 | 20 | 20 | 20 | 20 | — |
| | SAN resin (B2) | 15 | 15 | 15 | 15 | 15 | 15 | 15 | 15 | 15 | 70 | 20 | 20 | 20 | 20 | 20 | 20 | — |
| Polyester resin (C) | C1 | 40 | 40 | 40 | 40 | 35 | 20 | 15 | — | 40 | — | 40 | 40 | 40 | 40 | 40 | 40 | — |
| | C2 | — | — | — | — | — | — | — | 40 | — | — | — | — | — | — | — | — | 40 |
| PETG (D) | | 5 | 5 | 5 | 5 | 10 | 15 | 20 | 5 | 5 | — | — | — | — | — | — | — | — |
| drying conditions prior to injection | Temperature | 100 | 80 | 100 | 80 | 80 | 80 | 80 | 80 | 80 | 80 | 100 | 80 | 100 | 80 | 80 | * | 80 |
| | Time | 3 | 3 | 1 | 1 | 1 | 1 | 1 | 1 | 1 | 2 | 3 | 3 | 1 | 1 | 1 | — | 1 |

* No results were obtained in Comparative Example 7 due to gelation during the extrusion process.

(3) Hydrolysis resistance: hydrolysis resistance is indirectly measured by the difference of chemical resistance and impact strength according to the drying conditions prior to injection, and the results are shown in Table 2.

TABLE 2

| Composition | | Examples | | | | | | | | | Comparative Examples | | | | | | | |
|---|---|---|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 | 6 | 7 | 8 |
| Impact strength (1/8" kgf cm/cm) | | 72 | 65 | 67 | 62 | 64 | 66 | 67 | 66 | 70 | 31 | 65 | 40 | 43 | 30 | 35 | — | 28 |
| Chemical resistance | Detergent (alkali) | NC | NC | NC | NC | NC | NC | 2.4 | NC | NC | 0.7 | NC | 2.1 | 2.2 | 1.2 | 1.9 | — | 1.3 |
| | Detergent (acid) | NC | NC | NC | NC | NC | NC | 2.3 | NC | NC | 1.2 | NC | 2.2 | 2.2 | 1.2 | 1.8 | — | 1.4 |
| | Diesel oil | 1.8 | 1.8 | 1.8 | 1.7 | 1.8 | 1.6 | 1.5 | 1.7 | NC | 0.3 | 1.8 | 1.5 | 1.6 | 0.9 | 1.1 | — | 0.8 |
| | Aromatic | 2.1 | 2.1 | 2.1 | 2.1 | 2.1 | 2.0 | 1.9 | 2.1 | 2.2 | 0.3 | 1.9 | 1.5 | 1.7 | 1.0 | 1.1 | — | 0.7 |
| | Salad oil | NC | NC | NC | NC | NC | NC | NC | NC | NC | 1.9 | NC | NC | NC | 2.2 | 1.9 | — | 1.8 |

* NC: no crack
* No results were obtained in Comparative Example 7 due to gelation during the extrusion process.

Hydrolysis resistance is measured indirectly through the degree of deterioration of chemical resistance and impact strength caused by moisture that remained in injected products. If other conditions are same and similar chemical resistance and impact strength are exhibited compared to a case of completely drying, it can be determined that hydrolysis resistance can be considered to be good, and if lower chemical resistance and impact strength are exhibited, hydrolysis resistance can be considered to be low.

As shown in Table 2, when the PETG of the present invention is used, there is not a large difference between incomplete drying (Examples 4-9) and complete drying (Example 1 and Comparative Example 2) in terms of impact strength and chemical resistance. However, Comparative Examples not using the PETG and being dried incompletely (Comparative Examples 5, 6 and 8) exhibit significantly deteriorated impact strength and chemical resistance.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A chemical-resistant and impact-resistant thermoplastic resin composition having hydrolysis resistance, the thermoplastic resin composition comprising:
   (A) about 1 to about 97.9% by weight of an epoxy group-containing vinyl copolymer resin, wherein said epoxy group-containing vinyl copolymer resin is prepared by polymerizing a monomer mixture comprising about 0.01 to about 5.0 mol % of an epoxy group-containing unsaturated epoxy compound ($A_1$) and about 95 about 99.99 mol % of a vinyl compound ($A_2$);
   (B) about 1 to about 97.9% by weight of a rubber modified aromatic vinyl copolymer resin;
   (C) about 1 to about 97.9% by weight of a polyester resin; and
   (D) about 0.1 to about 97% by weight of a polyethylene glycol terephthalate glycol cyclohexane diol modified resin.

2. The thermoplastic resin composition of claim 1, wherein said unsaturated epoxy compound ($A_1$) is represented by the following chemical formula 1:

[Chemical Formula 1]

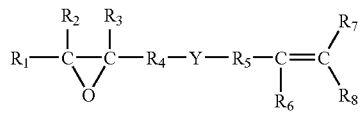

wherein: $R_1$, $R_2$, $R_3$, $R_6$, $R_7$ and $R_8$ are each independently hydrogen, saturated or unsaturated $C_1$-$C_{12}$ alkyl, $C_6$-$C_{14}$ aryl, or saturated or unsaturated $C_1$-$C_{12}$ alkyl-substituted $C_6$-$C_{14}$ aryl; and
Y is an ether group (—O—), carboxyl group (-0-[C═O]—, —[O═C]—O—), $C_1$-$C_{12}$ alkylene, $C_6$-$C_{14}$ arylene, or saturated or unsaturated $C_1$-$C_{12}$ alkyl-substituted $C_6$-$C_{14}$ arylene;
with the proviso that when Y is an ether group (—O—) or carboxyl group (-0-[C═O]—, —[O═C]—O—), $R_4$ and $R_5$ are each independently $C_1$-$C_{12}$ alkylene, $C_6$-$C_{14}$ arylene or saturated or unsaturated $C_1$-$C_{12}$ alkyl-substituted $C_6$-$C_{14}$ arylene; and when Y is $C_1$-$C_{12}$ alkylene, $C_6$-$C_{14}$ arylene or saturated or unsaturated $C_1$-$C_{12}$ alkyl-substituted $C_6$-$C_{14}$ arylene, Y represents a ($R_4$—Y—$R_5$) structure.

3. The thermoplastic resin composition of claim 2, wherein said unsaturated epoxy compound ($A_1$) is selected from the group consisting of epoxy alkyl acrylate, allyl glycidyl ester, aryl glycidyl ester, glycidyl methacrylate, glycidyl acrylate, butadiene monooxide, vinyl glycidyl ether, glycidyl itaconate and mixtures thereof.

4. The thermoplastic resin composition of claim 1, wherein said vinyl compound comprises about 40 to about 90% by weight of an aromatic vinyl monomer and about 10 to about 60% by weight of a monomer copolymerizable with the aromatic vinyl monomer.

5. The thermoplastic resin composition of claim 4, wherein said monomer copolymerizable with the aromatic vinyl monomer is an unsaturated nitrile monomer.

6. The thermoplastic resin composition of claim 1, wherein said rubber modified aromatic vinyl copolymer resin (B) comprises ($B_1$) about 10 to about 100% by weight of a graft copolymer resin and ($B_2$) about 0 to about 90% by weight of a copolymer resin.

7. The thermoplastic resin composition of claim 1, wherein said rubber modified aromatic vinyl copolymer resin (B) has a Z-average rubber particle size of about 0.1 to 6.0 μm.

8. The thermoplastic resin composition of claim 1, wherein said polyester resin (C) comprises inorganic particles.

9. The thermoplastic resin composition of claim 1, wherein said polyethylene glycol terephthalate glycol cyclohexane diol modified resin (D) has an intrinsic viscosity of about 0.5 to about 1.0 dL/g.

10. The thermoplastic resin composition of claim 1, wherein said polyethylene glycol terephthalate glycol cyclohexane diol modified resin (D) comprises about 0.1 to about 99 mol % of 1,4-cyclohexanedimethanol per total acid component.

11. The thermoplastic resin composition of claim 1, wherein said polyethylene glycol terephthalate glycol cyclohexane diol modified resin (D) has about 20 to about 60 mol % of 1,4-cyclohexanedimethanol per total acid component.

12. The thermoplastic resin composition of claim 1, wherein said thermoplastic resin composition comprises (A) about 10 to about 80% by weight of an epoxy group-containing vinyl copolymer resin; (B) about 10 to about 80% by weight of a rubber modified aromatic vinyl copolymer resin; (C) about 1 to about 60% by weight of a polyester resin; and (D) about 1 to about 30% by weight of a polyethylene glycol terephthalate glycol cyclohexane diol modified resin.

13. The thermoplastic resin composition of claim 1, wherein said thermoplastic resin composition has an Izod impact strength (ASTM D 256, ⅛" notch) of about 70 kgf cm/cm or more measured for a specimen injected after drying for 3 hours at 100 ° C., and the difference between the Izod impact strength and an Izod impact strength measured for a specimen injected after drying for 1 hour at 80 ° C. is about ±15 kgf·cm/cm or less.

14. The thermoplastic resin composition of claim 1, further comprising at least one additive selected from the group consisting of anti-dropping agents, flame retardants, antimicrobials, releasing agents, thermal stabilizers, antioxidants, light stabilizers, compatibilizers, pigments, inorganic fillers, surfactants, nucleating agents, coupling agents, fillers, plasticizers, impact modifiers, colorants, stabilizers, lubricants, antistatic agents, dyes, flameproof agents, and combinations thereof.

15. A molded article produced from the thermoplastic resin composition as defined by claim 1.

16. The thermoplastic resin composition of claim 1, wherein said polyester resin (C) consists of the polycondensation of one or more aromatic dicarboxylic acids or esters thereof selected from the group consisting of terephthalic acid (TPA), isophthalic acid (IPA), 1,2-naphthalene dicarboxylic acid, 1,4-naphthalene dicarboxylic acid, 1,5-naphthalene dicarboxylic acid, 1,6-naphthalene dicarboxylic acid, 1,7- naphthalene dicarboxylic acid, 1,8-naphthalene dicarboxylic acid, 2,3-naphthalene dicarboxylic acid, 2,6-naphthalene dicarboxylic acid, 2,7-naphthalene dicarboxylic acid, aromatic dicarboxylate in which acid is substituted with a dimethyl group, alkyl ester of naphthalene dicarboxylate, dimethyl-1,2-naphthalate, dimethyl-1, 5-naphthalate, dimethyl-1,7-naphthalate, dimethyl-1, 8-naphthalate, dimethyl-2,3-naphthalate, dimethyl-2,6-naphthalate and dimethyl-2,7-naphthalate, and one or more $C_2$-$C_{12}$ diols selected from the group consisting of ethylene glycol, 1,2-propylene glycol, 1,3-propylene glycol, 2,2-dimethyl-1,3-propanediol, 2,2-dimethyl-1,3-propylene glycol, 1,3-butanediol, 1,4-butanediol, 1,5-pentanediol, 1,6-hexanediol, 1,3-cyclohexane dimethanol and 1,4-cyclohexane dimethanol,.

17. The thermoplastic resin composition of claim 1, wherein said polyethylene terephthalate glycol modified resin (D) comprises about 0.1 to about 50 mol% of 1,4-cyclohexanedimethanol.

* * * * *